United States Patent [19]

Bertolette

[11] 4,111,346
[45] Sep. 5, 1978

[54] TUBE CUTTING MACHINE WITH BREAK-OFF MEANS

[75] Inventor: Reed Bertolette, Woodbury, Conn.

[73] Assignee: Bertolette Machines, Inc., Torrington, Conn.

[21] Appl. No.: 758,417

[22] Filed: Jan. 11, 1977

[51] Int. Cl.² .......................... B26F 3/00; B26D 3/08; B26D 3/16; B23B 5/14
[52] U.S. Cl. ....................................... 225/96.5; 82/59; 82/70
[58] Field of Search .................. 225/96.5; 82/59, 61, 82/62, 65, 67, 68, 69, 70

[56] References Cited

U.S. PATENT DOCUMENTS

| | | | |
|---|---|---|---|
| 1,585,896 | 5/1926 | Danner | 225/96.5 X |
| 3,268,137 | 8/1966 | Martin | 225/96.5 X |
| 3,515,326 | 6/1970 | Saito et al. | 225/96.5 |
| 3,656,219 | 4/1972 | Connelly | 82/59 |
| 3,659,764 | 5/1972 | Janizewski | 225/96.5 X |
| 3,739,666 | 6/1973 | Wright et al. | 82/59 |
| 3,877,625 | 4/1975 | Brock | 225/96.5 X |

Primary Examiner—J. M. Meister
Attorney, Agent, or Firm—McCormick, Paulding & Huber

[57] ABSTRACT

A tube cutting machine has a cutting station and an intermittently operable feed means comprising an air cylinder operating a feed clamp assembly. The cylinder and clamp assembly axially advance an elongated section of tubing to present trailing end portions of leading end tube sections at the cutting station. A cutting clamp assembly securely holds the tube rearwardly of each trailing end portion for the cutting operation. A centrally apertured rotary cutting head has three radially movable rotary cutters or rollers which effect a partial cut at each trailing end portion. The cutting head and its operating means include positive mechanical actuating means for the small rotary cutters or rollers and an adjustable means is provided for precisely limiting inward cutter or roller movement in accordance with tube diameter and wall thickness. The adjustable means comprises an adjustably mounted limit switch which terminates operation of an air cylinder which in turn effects a drive belt deflection resulting in an angular displacement of a cutter actuator pulley relative to a head driving pulley. With a circumferentially uniform partial cut of controlled depth, a subsequent break-off operation effects a clean break with minimal ID reduction. Break off means comprise a quill and an air cylinder and, alternatively, a hinged break off supporting cylinder swingably operated by an air cylinder.

18 Claims, 8 Drawing Figures

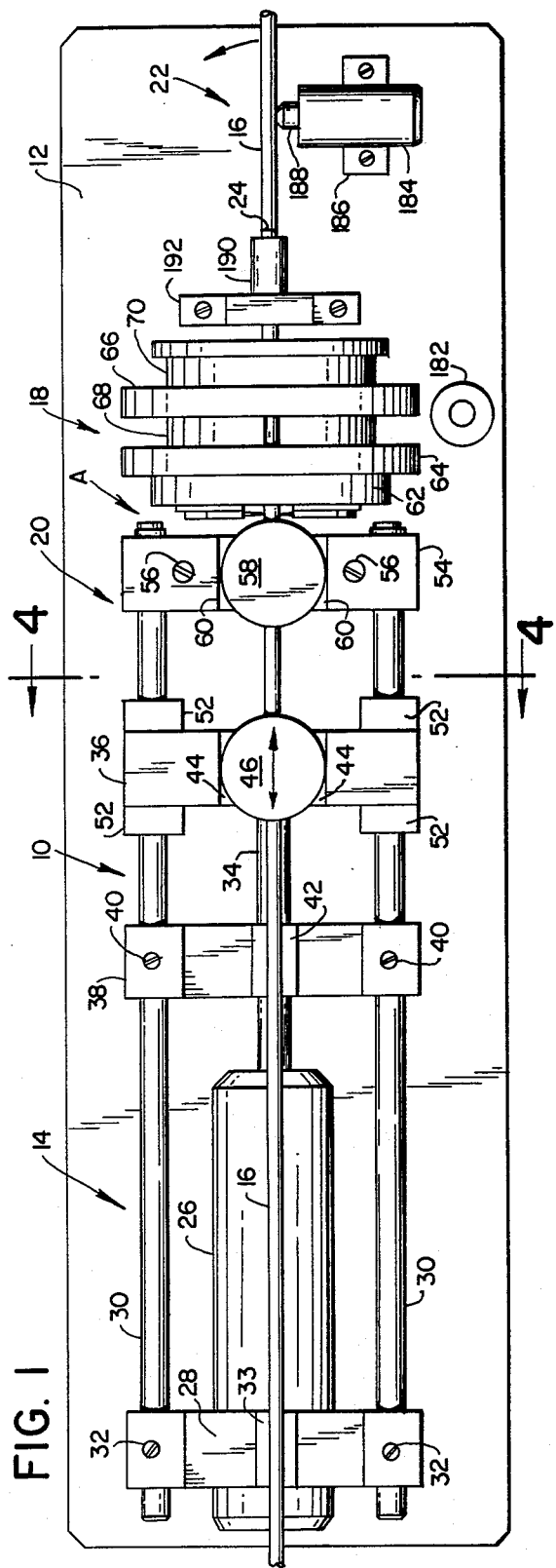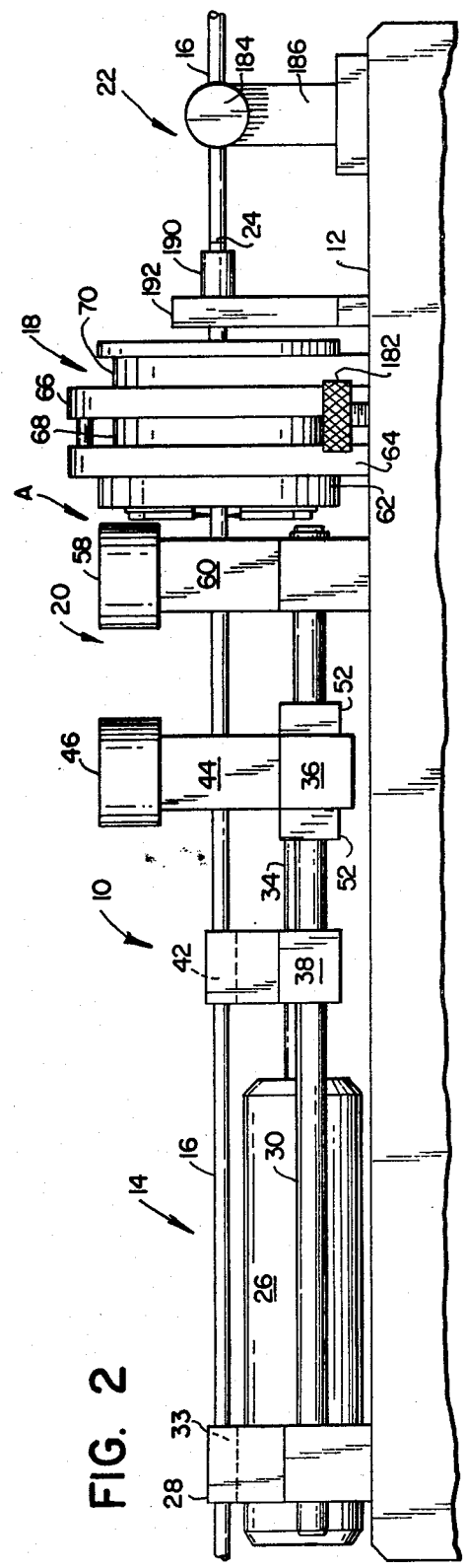

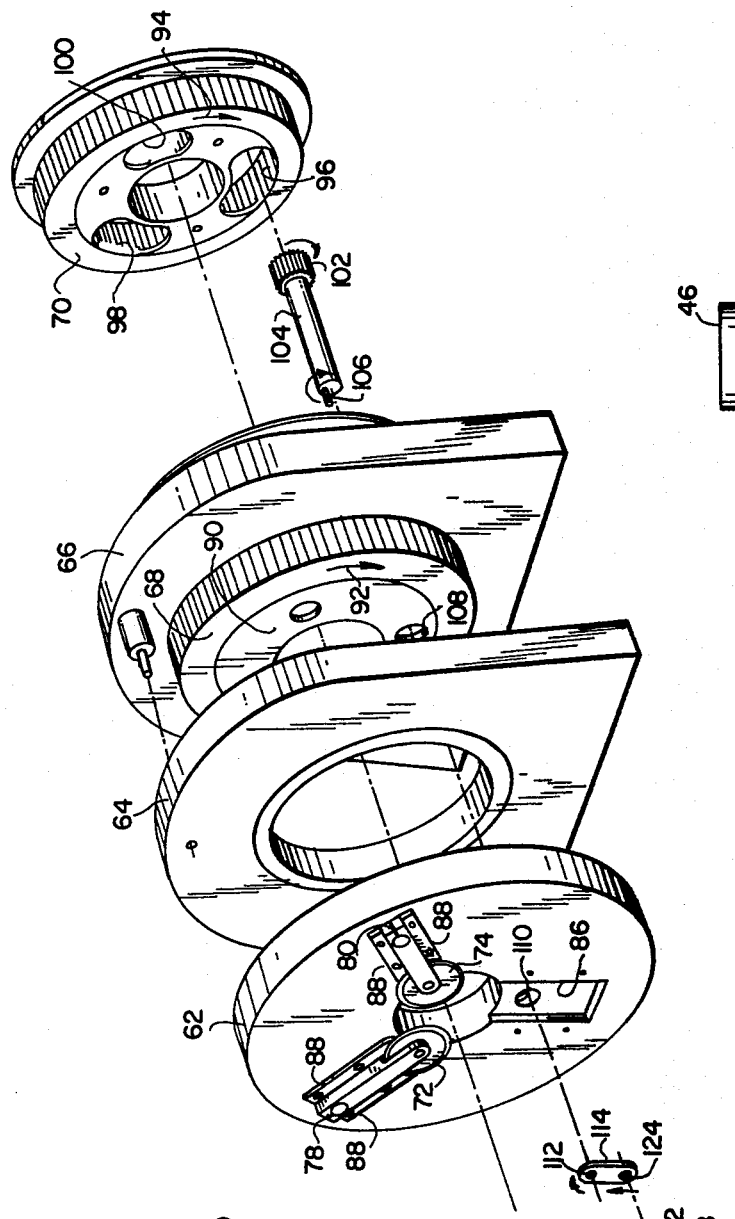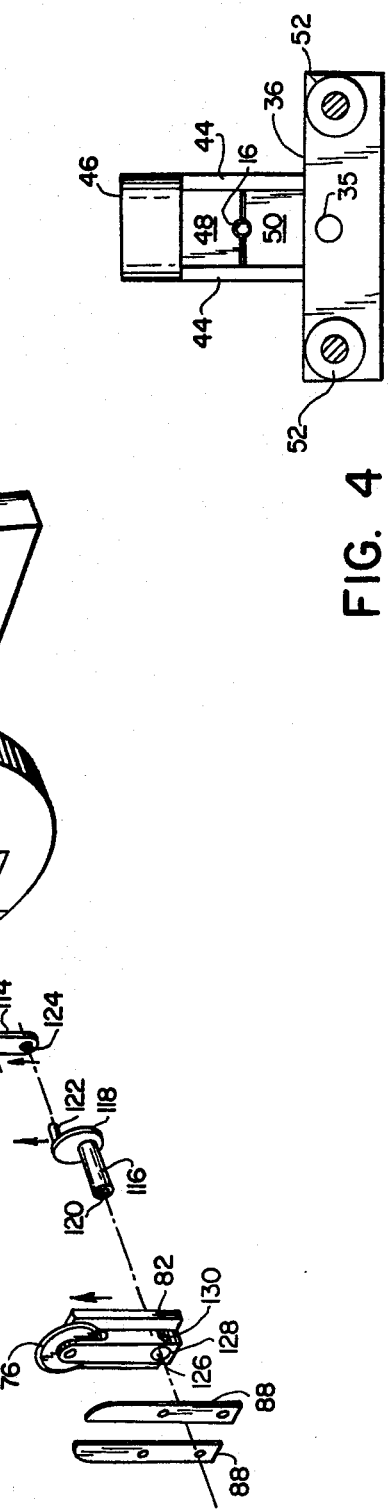

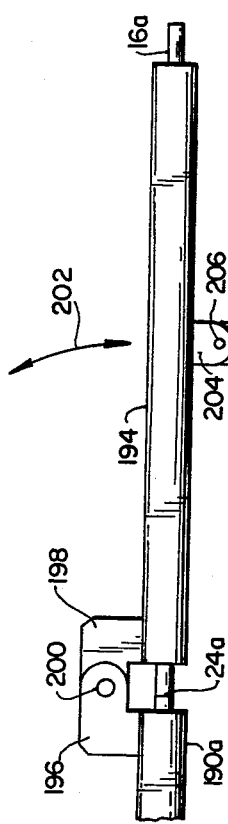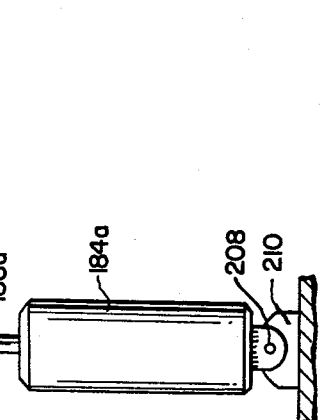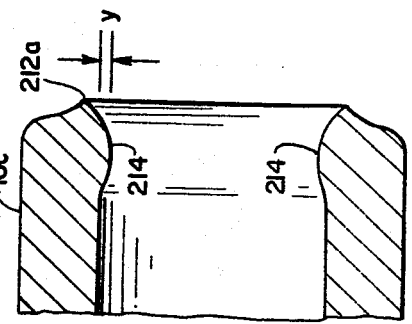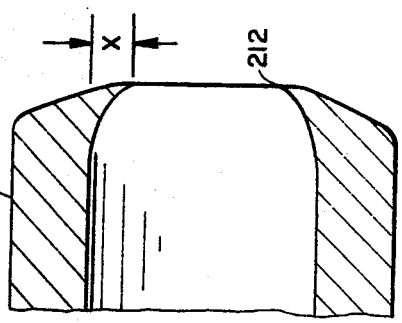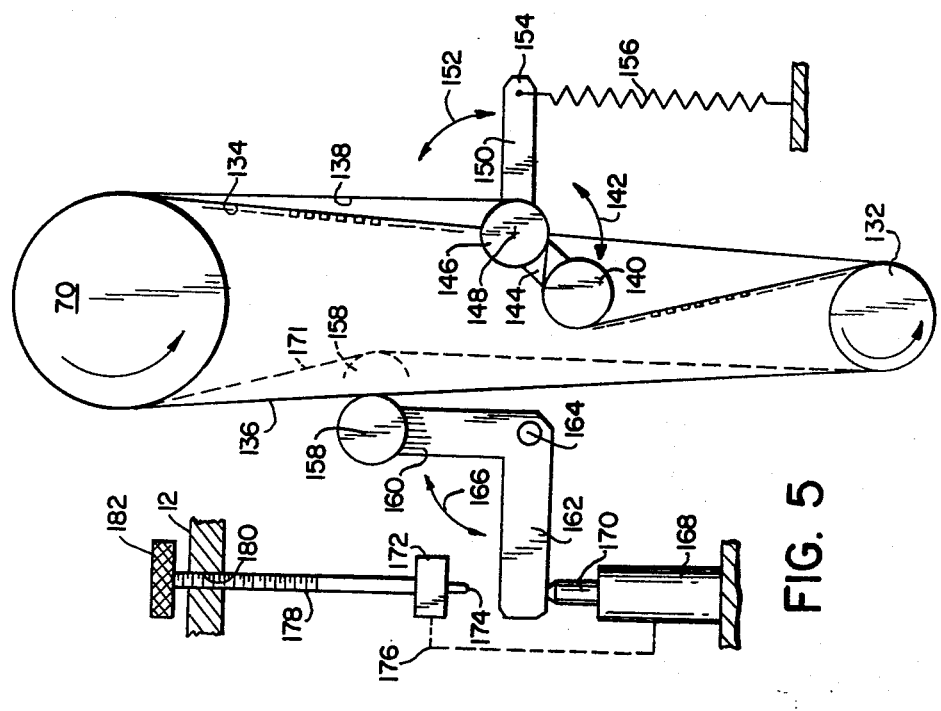

TUBE CUTTING MACHINE WITH BREAK-OFF MEANS

BACKGROUND OF THE INVENTION

Tube cutting machines employing a plurality of small rotary cutters have been extensively and successfully used in the past. An accurate, scrapless cut is achieved and with proper cutter selection and control, ID reduction and internal burring is minimized. There are, however, many applications where little or no ID reduction or burring is permissable. ID reductions on the order of several thousandths are usually encountered and even a few thousandths may be objectionable in certain applications.

SUMMARY OF THE INVENTION

It is the general object of the present invention to provide an improved tube cutting machine wherein little or no ID reduction or burring is encountered.

In fulfillment of this object a "cut and break" technique is employed wherein a partial cut is provided of precisely controlled depth in accordance with tube diameter and wall thickness. Moreover, the cut is of a high degree of uniformity circumferentially and a subsequent break-off operation results in ID reductions on the order of one or two thousandths and even in the complete elimination of ID reduction. The break-off operation is effected by a generally radial force and yet there is no collapse or flattening of the tubing end surface on an opposite side thereof and in fact a uniform sharp generally axially facing edge is provided throughout the tube circumference. Further, the sharp edge resides at or radially outwardly of the tube ID and a "radius" occurs extending therefrom to the tube ID. The radius is highly desirable in the subsequent insertion of other tubing or cylindrical members into the open severed end of the tube section.

BRIEF DESCRIPTION OF THE DRAWINGS

FIG. 1 of the drawings is a somewhat schematic top view of the improved tube cutting machine of the present invention.

FIG. 2 is a somewhat schematic side elevational view of the tube cutting machine.

FIG. 3 is a somewhat schematic exploded perspective view of the cutting head assembly and operating means thereof.

FIG. 4 is a somewhat schematic fragmentary sectional view taken generally as indicated at 4—4 in FIG. 1.

FIG. 5 is a schematic view showing a further portion of an operating means for the cutter head assembly and adjustable limiting means for controlling the depth of cut effected by the cutter head assembly.

FIG. 6 is a schematic top view of an alternative break-off assembly forming a second embodiment of the present invention.

FIG. 7 is a schematic cross sectional view of an end of a tube section severed by a conventional prior art tube cutting machine in a "through cut" operation.

FIG. 8 is a schematic cross sectional view of an end of a tube section partially severed and broken off by the tube cutting machine of the present invention.

DESCRIPTION OF PREFERRED EMBODIMENTS

Referring particularly to FIGS. 1 and 2, it will be observed that a Cutting Station A is provided in a tube cutting machine indicated generally at 10 and constructed in accordance with the present invention. The tube cutting machine 10 has its principal operating elements mounted atop a table-like horizontally extending and generally rectangular frame member 12, drive means for the operative machine elements being conveniently disposed therebeneath.

An intermittently operable power feed means for the machine is indicated generally at 14 and serves to axially advance an elongated section of tubing such as 16 from left to right in FIGS. 1 and 2. The section of tubing at 16 is so advanced by the feed means as to successively present trailing end portions of leading end tube sections to the Cutting Station A. At the Cutting Station A, a cutting head assembly indicated generally at 18 operates to partially sever the leading end tube sections in succession as they are first advanced by the feed means and thereafter securely held by a fixed clamp assembly indicated generally at 20. The partially severed leading end sections are thereafter successively acted upon by a break-off assembly indicated generally at 22 and which applies a sharp generally radially directed force to effect a clean break to a partial cut 24.

The feed means 14 may vary widely within the scope of the invention, but as illustrated, a fluid operable cylinder 26 is preferably provided and is secured at a rear end position by means of a suitable bracket member 28 mounted on the frame member 10. The bracket 28 also secures rear end portions of a pair of identical longitudinally extending and laterally spaced guide rods 30, 30. The bracket 28 may be fixed to the frame member 12 as by appropriate screws or bolts 32, 32 and is provided with an integral upright support for the elongated tube 16. That is, an integral upstanding portion of the bracket may include an upwardly open V-shaped groove as at 33 for slidably supporting the section of tubing 16.

The fluid operable cylinder 26 preferably takes the form of an air cylinder and has a conventional rod 34 projecting therefrom and longitudinally toward the Cutting Station A. The rod 34 reciprocates in the usual manner and at its forward end portion is fixedly connected to a slide 36 mounted on the guide rods 30, 30. The slide 36 is movable between the fixed clamp assembly 20 and a rear stop 38 also mounted on the guide rods 30, 30. The rear stop 38 is secured to the guide rods 30, 30 by means of suitable binder screws 40, 40 and is adjustable therealong as may be required for the desired stroke of the rod 34. Thus, it will be apparent that the feed stroke and the length of tubing advanced during each stroke may be readily adjusted and controlled by conventional means such as limit switches and solenoid operated valves associated with the air cylinder 26.

A second means of support for the section of tubing is preferably provided at the stop 38 and may comprise an integral upstanding central portion having a V-groove 42 as illustrated.

The slide 36 forms a part of a feed clamp assembly operable in timed relationship with the air cylinder 26 to grip and release the tube 16 whereby successively to advance the same from left to right. As best illustrated in FIG. 4, the slide 36 carries two upright members 44, 44 which are spaced apart laterally and which support a fluid operable cylinder 46 thereabove. The fluid operable cylinder 46 is preferably of the air type and of a configuration commonly known as a "pancake cylinder". The air cylinder 46 operates to urge an upper clamping block 48 downwardly into engagement with the tubing 16 disposed between the said block and a fixed lower clamping block 50. Thus, the tube is securely clamped and held when the cylinder 46 is actuated and, on release of downward pressure by the cylinder on the block 48, relative sliding movement between the tube and the clamping blocks is accommodated.

Small bosses or sleeves 52, 52 on and about the guide rods 30 are formed integrally with or fixed to the slide 36 and project longitudinally therefrom. Four bosses or sleeves are provided with the bosses of each pair facing in the same direction and pairs facing in opposite directions to provide front and rear stops. That is, the forwardly facing pair of bosses are engageable with the fixed clamp assembly 20 and the rearwardly facing bosses engageable with the rear stop 38.

The fixed clamp assembly 20 comprises a bracket 54 which may be mounted on the frame member 12 as by means of appropriate screws or bolts 56, 56 and which receives and supports forward end portions of the guide rods 30, 30. At an intermediate portion the clamping assembly includes vertically stacked upper and lower clamping blocks and a pancake air cylinder 58. The clamping blocks, not shown, may be identical with the blocks 48, 50 in FIG. 4 and may be held in position by upstanding members 60, 60 spaced laterally and supporting the cylinder 58. As will be apparent, conventional means may be employed for operating the air cylinder 58 in timed relationship with the air cylinder 26 and the feed clamp assembly. That is, the clamp assembly 20 is operative to secure the tube for a cutting operation when a forward stroke of the cylinder rod 34 has been completed positioning the tube for a partial severing operation of the cutting head assembly 18. During feed strokes, the pancake cylinder 58 is of course operated to release the tubing 16 for forward sliding movement through its associated clamping blocks.

The cutting head assembly 18 is best illustrated in FIGS. 1, 2 and 3 and comprises a rotary cutting head 62, first and second support members 64, 66 mounted on the machine frame 12, and first and second drive pulleys 68 and 70. The cutting head 62 is centrally apertured as are all of the members 62, 64, 66, 68 and 70, best illustrated in FIG. 3. Thus, a leading tube section may be introduced to the central apertures of the cutting head and the associated members from left to right in FIGS. 1 and 2 and the partial cut effected at a trailing end portion of such section by cutters mounted on the head.

In accordance with the invention, at least one small rotary cutter is provided on the cutting head 62 and, in the preferred form best illustrated in FIG. 3, three such cutters are provided at 72, 74 and 76. The small rotary cutters 72, 74 and 76 are adapted to be moved generally radially inwardly and outwardly respectively to engage and partially sever a tube and to retract therefrom. One or more of the cutters may have a flat peripheral surface and serve merely as a roller or rotary back up member and it will be apparent that various combinations of back-up rollers and cutters may be provided. Thus, a minimum of one rotary cutter may be provided with two back-up rollers, two cutters with a single back-up roller, etc. As shown, each of the small rotary elements 72, 74 and 76 may be regarded as cutting elements.

Still referring to FIG. 3, it will be observed that the cutters 72, 74 and 76 are restrained for linear movement along radial lines and are mounted respectively on slides 78, 80 and 82. The slides 78, 80 and 82 are equally spaced circumaxially and each slide has a corresponding guideway, two shown respectively for the slides 78 and 82 at 84, 86. Gibs 88, 88 secure the slides in their guideways in conventional manner.

The rotary head 62 is driven by the first pulley 68 which is preferably of the cog type and which is positively secured to the head and mounted on a sleeve 90. The second pulley 70, also preferably of the cog type, is coaxial with the pulley 68 but is independently mounted for rotation with and relative to the pulley 68. The said pulley serves as an element in an actuating means for the slides 78, 80, 82 and the cutters 72, 74 and 76.

Actuation of the rotary cutters and their slides for inward and outward movement is achieved by effecting angular displacement of the pulley 70 relative to the pulley 68 while the said pulleys are rotating in the same direction and at the same speed, clockwise rotation being indicated in FIG. 3 by the arrows 92, 94. Each of the three cutter slides has a discrete actuating means but for clarity of illustration a single actuating means has been shown and will be described. The actuating means shown drives the slide 82 and the cutter 76 and it will be understood that identical actuating means are or may be employed for the slides 78, 80 and the cutters 72 and 74.

Internal gear teeth are provided in the pulley 70 and while it will be apparent that a complete 360° internal gear could be employed, it is preferred that three segments are provided at 96, 98 and 100. The segments respectively drive small planet gears, one shown at 102, for partial rotation of the latter on occurrence of an angular displacement of the pulley 70 relative to the pulley 68.

The planet gear 102 has a shaft 104 which carries a small eccentric pin 106 at a free end portion thereof. Axial opening 108 in the sleeve 90 receives the shaft 104 and restrains the shaft and its gear for partial rotation about its own axis. At a free end portion, the shaft 104 also projects through an opening 110 in the head 62 and the eccentric pin 106 thereon is pivotally received in a small opening 112 in a free and swingable link 114. The link 114 serves to convert arcuate movement of the pin 106 to linear radial movement as required for actuation of the slide 82.

While it will be apparent that the link 114 might be connected directly to a pin on the slide 82, it is preferred that an intermediate adjustment element be included in the form of a small plug 116 which carries an integral cylindrical enlargement 118 at a rear end and which has a socket head opening or the like 120 at an opposite or front end. An eccentric pin 122 on the cylindrical enlargement 118 enters and is free to rotate in a small opening 124 in the link 114, the said opening being disposed at an end of the link opposite the opening 112. The plug 116 is received in a suitable cylindrical through opening 126 in the slide 82 with its socket head 120 exposed for manual adjustment. A split rear or outer end portion of the slide indicated at 128 has an associated binder screw 130 for clamping and releasing the plug 116 in the opening 126.

It will be apparent from the foregoing that the plug 116 provides an important function in precise adjustment of the radial position of the slide 82 in a set-up operation. With the binder screw 130 slightly retracted, the plug 116 may be partially rotated by means of a suitable socket head tool inserted in the opening 120 whereby to establish a desired reference position for the slide 82 relative to a tube section to be cut. Slight arcuate movement of the pin 122 will displace the link 114 at the opening 124 within the guideway 86 to effect the desired linear adjustment of the slide 82 along its radial line of movement. A very precise adjustment is attainable as required for close depth control and circumferential uniformity of the partial cut operation of the tube cutting machine.

As will be apparent, each of the slides 78, 80, 82 and their respective cutters or rollers are precisely adjusted to desired reference positions by means of plug 116 and identical plugs in the remaining slides. Precise set-up having been achieved, a high degree of accuracy and repeatability results in the partial cutting operation, the actuating means for the slides and cutters being positive and mechanical in nature with no slippage or other unintended or accidental displacement of elements occurring.

FIG. 5 best illustrates the manner in which the first and second pulleys 68 and 70 are driven as well as the means for achieving the necessary running angular displacement of the pulley 70 relative to the pulley 68. Pulley 70 is illustrated in FIG. 5 and it will be understood that the pulley 68 is disposed directly therebehind in coaxial relationship and driven by a cog belt from common drive pulley 132. The right hand and upwardly moving pass of the cog belt driving the pulley 68 is shown at 134. A left hand and downwardly moving pass of the cog belt lies directly behind a similar belt pass 136 which drives the pulley 70. A right hand and upwardly moving pass of the cog belt driving the pulley 70 is illustrated 138 and has an associated idler pulley 140 which is adapted for spring biased radial movement. That is, the pulley 140 is movable generally radially with respect to its axis through an arcuate path indicated by arrow 142. An arm 144 supports the pulley 140 for free rotation and a second idler pulley 146 is freely rotatable about a point 148, which point also forms a pivot axis for the arm 144. The arm 144 has an associated arm 150 fixed relative to the arm 144 and swingable therewith about the axis 148 in directions indicated by arrow 152. At an outer and free end portion 154 of the arm 150, a tension spring 156 is adapted to urge the arm in a clockwise direction thereby urging the idler pulley 140 in a clockwise direction, or generally toward the left in FIG. 5. The right hand cog belt pass 138 for the pulley 70 extends upwardly from drive pulley 132 and has sufficient slack so as to be disposed partially about the pulley 140, rightwardly therefrom beneath and partially about the pulley 146 and then upwardly to the pulley 70.

The left hand or downward pass 136 of the cog belt driving the pulley 70 has an associated roller or pulley 158 disposed externally in engagement therewith and mounted for rotation at a free end portion of one arm 160 of a generally L-shaped member having a second arm 162. The arm 160 is disposed generally vertically and the arm 162 generally horizontally with the L-shaped member pivotally mounted about an axis 164. Arcuate movement of the L-shaped member as indicated by the arrow 166 may be effected by means of a fluid operable cylinder such as air cylinder 168 having a rod or plunger 170 engageably with a free end portion of arm 162.

On operation of air cylinder 168 urging its rod or plunger 170 upwardly in FIG. 5, it will be apparent that the roller 158 will be swung in a clockwise direction urging the left hand or downward belt pass 136 rightwardly or inwardly as indicated by broken line 171. When such action occurs with the pulleys 68 and 70 being rotated simultaneously and at the same speed by the common drive pulley 132, the pulley 70 is angularly displaced (advanced) with respect to the pulley 68. The idler pulley 140 is swung in a generally counterclockwise direction against the urging of spring 156 and, on release of pressure by the roller 158, the belt passes 136, 138 return to the full line positions shown for continued rotation of the pulley 70 in unison with and at the same speed as the pulley 68. Further, it will be apparent that the temporary angular displacement or advance of the pulley 70 relative to the pulley 68 will result in a partial rotation of planet gear 102, FIG. 3, and its counterparts and the cutters 72, 74, 76 will be urged inwardly in a partial tube cutting operation. Still further, it will be apparent that the extent of movement of the roller 158 will determine the precise amount or degree of inward movement of the cutters and their slides. The cog belts provide a positive drive and the extent of movement of the roller 158 can be closely controlled whereby to accurately control cutter movement and to determine precisely the depth and uniformity of the partial cut.

An adjustable means for limiting precisely the movement of the roller 158 and for thus precisely limiting depth of the partial cut is provided in further accordance with the present invention. Said means may vary in form but preferably comprises a limit switch 172 which has its plunger 174 disposed in the path of movement of the arm 162 and which is adjustably mounted. The limit switch is adapted to control the operation of the air cylinder 168 and such connection is illustrated by broken line 174. The manner in which the limit switch controls the operation of the air cylinder 168 may be conventional and may include the provision of a solenoid operated valve controlled by the switch and operating the air cylinder.

The manner in which the adjustable mounting for the limit switch is provided may also vary but preferably includes an elongated lead screw 178 threadably entered in a suitable opening 180 in the machine frame 112 and supporting the limit switch 172 at a lower end portion. A manually operable adjustment wheel or knob 182 at an upper end portion of the lead screw 178 is exposed atop the machine frame 12, FIGS. 1 and 2, so as to be readily manipulated by a machine operator during set up. A cut and try method may be employed in adjusting the knob 182 for the desired depth of cut in the tube sections.

Reverting now to FIGS. 1 and 2, it will be observed that the break off means 22 is illustrated in the form of a fluid operable cylinder 184 mounted on the machine frame 12 by means of a bracket 186 and having its axis disposed generally radially with respect to the tubing 16. A cylinder plunger or rod 188 is arranged to engage a leading end section of the tubing 16 and to exert a sharp generally radially directed force in a break off operation. A quill 190 takes the form of a cylindrical member having an axial opening axially aligned with and adapted to slidably receive but securely hold the tubing. The quill 190 is supported on the machine frame 12 by means of a bracket 192.

As will be apparent, the quill 190 securely holds a leading end portion of a section of tubing having its trailing end portion positioned at the Cutting Station A. A preceding partial cut 24 is disposed forwardly of the quill 190 and preferably in closely spaced relationship therewith. Thus, the preceding leading end tube section extends forwardly from the quill and is engaged by the plunger 188 and cleanly broken off. Such action may occur simultaneously with a partial cutting operation on the next succeeding tube section at the Station A. It should also be noted that the cutting head assembly may be reversely oriented; that is, the assembly may be rotated through 180°, the quill eliminated and the break off means operated on a leading end section immediately following a partial cut at its trailing end portion. In such event, the cutters may be maintained in engagement with the tube during break off for clamping action or, alternatively, clamping means may be provided within the cutting head and operated automatically to secure the tube during break off.

In FIG. 6, an alternative break off means is illustrated and forms a second embodiment of the present invention. It should be understood that an associated tube cutting machine may be identical in all respects with the machine illustrated in FIGS. 1-5 and described above. A quill 190a may be of appropriate length for the support of leading end tube sections somewhat longer than those accommodated in the machine of FIGS. 1-5. A support means is provided for the forwardly projecting leading end section of tubing 16a to be broken off at a partial cut 24a. The partial cut 24a is disposed forwardly of and in closely spaced relationship with the quill 190a. The support means takes the form of a cylinder 194 having an axial opening for receiving the tube as it is advanced by the feed means 14 after a partial cutting operation. The axial opening is of such dimension as to slidably receive and yet securely hold the tubing. At a rear end portion the cylinder 194 is supported for swinging movement generally about the partial cut 24a. That is, hinge members 196, 198 respectively secured to the quill and the cylinder are pivotally connected at 200 to provide for arcuate movement of the cylinder generally as indicated by arrow 202.

A fluid operable cylinder 184a, preferably in the form of an air cylinder, has a rod or plunger 188a pivotally connected to a small bracket 204 at 206. The bracket 204 is fixedly mounted on the cylinder 194 so that forward movement of the plunger 188a will operate to swing the cylindrical member 194 in a counterclockwise direction as shown and, conversely, rearward or retractile movement of the plunger will return the cylinder in clockwise movement to the position shown, said position being in axial alignment with the quill 198 and the tubing 16a. The air cylinder 184a is pivotally mounted as by means of a small bracket 208 at its rear end portion and a fixed bracket 210.

When the cylinder 194 has been pivoted by the air cylinder 184a in a break-off operation and has been thereafter returned to a position of axial alignment, a further advance of the tubing 16a will obviously serve to eject the separated leading end tube section from the right hand end of the cylinder.

The significance of the "cut and break" technique of the present invention as compared with conventional "through cutting" is best appreciated with reference to FIGS. 7 and 8. In FIG. 7 an end section of tubing 16b is illustrated in a somewhat schematic manner and it will be observed that a substantial ID reduction has occurred in a conventional "through cut" operation. The dimension X represents ID reduction and it will be observed further that a relatively sharp inwardly directed annular edge 212 results from the "through cut".

In FIG. 8, tubing 16c has been severed in a "cut and break" operation in accordance with the present invention. It will be observed that a much smaller ID reduction, dimension Y, results. Further the break off operation results in repositioning of the sharp edge 212a to a location intermediate the inner and outer walls of the tubing and in orientation of the edge in a generally axial direction. More importantly, a "radius" or an annular arcuate contour 214 is provided at the innermost and outwardly facing portion of the tube wall. When such tubing is employed in assembly operations where, for example, a second and smaller tube is inserted into the tube 16c, the "radius" or arcuate surface 214 provides for a high degree of ease and convenience during insertion and, in fact, any slight ID reduction which has occurred may be overcome in an outward pressing or camming action thereon by the end of the inserted tube.

It should also be noted that the edge 212a is uniform and sharp throughout. No crushing or flattening occurs on a side opposite the break-off means and the tube end instead has the appearance of having been axially pulled apart.

The table set forth below provides an illustrative example of the improvement in ID reduction achieved with the "cut and break" technique and the improved tube cutting machine of the present invention.

| CONVENTIONAL THROUGH-CUT | "CUT AND BREAK TECHNIQUE" |
|---|---|
| Tube Diameter OD - 3/8" | same |
| Material - Soft Copper | Same |
| Wall Thickness - .030 thousandths | Same |
| ID Reduction -.006 to .008 thousandths | .001 thousandths |

In other tests with the improved tube cutting machine of the present invention, ID reductions as high as 0.015 have been reduced to the level of 0.001 or 0.002 and even eliminated in the sense that they are so insignificant as to be beyond conventional gauging techniques.

The depth of the partial cut prior to break off is dependent upon wall thickness, diameter of the tubing, type of material, etc. For best results, it is believed that the partial cut should be of a depth approximating two thirds wall thickness or until a discernable ring or ridge appears in the tube ID opposite cutter engagement.

I claim:

1. In a tube cutting machine having a cutting station, the combination of power feed means for axially advancing an elongated section of tubing whereby successively to present at said cutting station trailing end portions of leading end tube sections to be severed, intermittently operable clamping means successively engageable with said section of tubing rearwardly of said trailing end portions to secure the same for cutting, a centrally apertured rotary cutting head at said cutting station adapted successively to receive said leading end tube sections, said head having at least one small rotary cutter adjacent said central aperture mounted for generally radial inward and outward movement respectively to engage and cut said leading end tube sections at their trailing end portions and to withdraw from engagement therewith, power operated means for rotating said cutter head and for intermittently moving said rotary cutter inwardly and outwardly for successive cutting operations, said means including a precise and positive mechanism which is mechanical throughout and which is operable to effect radial inward cutter movement while the cutter head is rotating, and said means also including separate positive drive means respectively for rotating said cutter head and for causing said mechanical mechanism to effect said radial inward cutter movement, adjustable means operable on the positive drive means for the positive mechanical mechanism effecting cutter movement and imposing a positive limit on said mechanism to precisely limit inward cutter movement in accordance with tube diameter and wall thickness whereby to provide a circumferentially uniform partial cut of controlled depth at each said trailing end portion, and intermittently operable means for successively applying sharp generally radially directed forces to leading end sections forwardly of their trailing edge portions whereby successively to break off said sections subsequent to said partial cutting operations.

2. The combination in a tube cutting machine as set forth in claim 1 wherein said intermittently operable break-off means includes a fluid operable cylinder with its axis generally radially disposed with respect to the tube leading end sections.

3. The combination in a tube cutting machine as set forth in claim 2 wherein said cylinder has a plunger movable in one and an opposite direction generally in a radial direction respectively to effect said sharp break-off forces and to retract for a subsequent operative stroke.

4. The combination in a tube cutting operation as set forth in claim 1 wherein an axially extending and axially apertured quill is provided between said cutting head and said break-off means, said quill being so dimensioned and positioned as to receive and securely hold at least a leading end portion of a tube section having its trailing end portion at the cutting station, the partially severed but integral trailing end portion of a preceding leading end tube section being disposed exteriorly adjacent the forward end of the quill and said preceding end section projecting forwardly therefrom past said break-off means for engagement thereby.

5. The combination in a tube cutting machine as set forth in claim 4 wherein the partial circumferential cuts at said trailing edge portions are located immediately adjacent said forward end of the quill, and wherein said break-off means is disposed a substantial distance forwardly therefrom adjacent the leading end tube sections.

6. The combination in a tube cutting machine as set forth in claim 4 wherein an elongated and axially extending tube supporting cylinder is provided forwardly and in axially aligned and spaced relationship with said quill, said cylinder having a through axial opening for receiving and slidably fitting a leading tube section, wherein hinge means is provided for swinging movement of said cylinder about its rear end portion, and wherein said break-off means is associated with said cylinder to effect a sharp swinging movement thereof away from its axially aligned position.

7. The combination in a tube cutting machine as set forth in claim 6 wherein said break-off means includes a pivotally mounted fluid operable cylinder with its axis generally radially disposed, and with its rod pivotally connected with said tube supporting cylinder.

8. The combination in a tube cutting machine as set forth in claim 1 wherein said means for moving said cutter inwardly comprises a fluid operable cylinder, and wherein said adjustable limiting means comprises a limit switch having an adjustable mount and operable to control said cylinder to terminate said inward cutter movement.

9. The combination in a tube cutting machine as set forth in claim 8 wherein an elongated lead screw is provided for mounting said limit switch, and wherein means is provided for manually rotating said screw whereby to preset the depth of cut.

10. The combination in a tube cutting machine as set forth in claim 8 wherein said means for rotating said cutting head and moving said cutter inwardly and outwardly comprises coaxial but independent first and second positively driven pulleys respectively driving said head and actuating said cutter, said second pulley having positive motion transmitting means associated therewith and connected with said cutter, and said pulley being angularly displaceable with respect to said first pulley for actuation of said motion transmitting means.

11. The combination in a tube cutting machine as set forth in claim 10 wherein said second pulley is provided with internal gear teeth, and wherein said motion transmitting means includes a planet gear engageable with said teeth and having a shaft for actuating said cutter, said planet gear being rotated in response to relative angular displacement of said second pulley.

12. The combination in a tube cutting machine as set forth in claim 11 wherein said planet gear shaft carries a small eccentric pin, wherein said cutter is mounted on a slide restrained for linear generally radial movement, and wherein a pivotal link is provided for connection between said pin and slide and for conversion of arcuate pin movement to linear slide movement.

13. The combination in a tube cutting machine as set forth in claim 12 wherein an adjustable plug is provided in said slide and carries a small eccentric pin connectible with said link, said plug being angularly adjustable in said slide for adjustment of slide position during set-up operations.

14. The combination in a tube cutting machine as set forth in claim 13 wherein three equally circumaxially spaced rotary cutters are provided, and wherein three motion transmitting means are provided as aforesaid respectively for actuating said cutters.

15. The combination in a tube cutting machine as set forth in claim 10 wherein said means for rotating said cutting head and moving said cutter inwardly and outwardly also includes a drive pulley connected with a power source and a pair of cog belts driven thereby and respectively driving said first and second pulleys, wherein cog belt driving said second pulley is slack and includes an idler pulley mounted for radial spring biased take-up movement, and wherein a means for displacing said belt is provided, said idler pulley being moved on displacement of the belt by said means and said second pulley being thus angularly displaced with respect to said first pulley whereby to actuate said motion transmitting means.

16. The combination in a tube cutting machine as set forth in claim 15 wherein said means for displacing said belt comprises an additional pulley mounted for radial movement and a fluid operable cylinder for effecting such movement.

17. The combination in a tube cutting machine as set forth in claim 16 wherein said limiting means comprises a limit switch associated with said fluid operable cylinder and controlling the same to terminate belt displacement when the desired depth of tube cut has been effected.

18. The combination in a tube cutting machine as set forth in claim 17 wherein said limit switch is adjustably mounted with provision for manual setting of depth of cut.

* * * * *